United States Patent
Chen et al.

(10) Patent No.: US 7,609,516 B2
(45) Date of Patent: Oct. 27, 2009

(54) COMPUTER ENCLOSURE WITH REMOVABLE BEZEL

(75) Inventors: Yun-Lung Chen, Tu-Cheng (TW); Zhou Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 487 days.

(21) Appl. No.: 11/309,400

(22) Filed: Aug. 4, 2006

(65) Prior Publication Data

US 2008/0030941 A1 Feb. 7, 2008

(51) Int. Cl.
G06F 1/16 (2006.01)

(52) U.S. Cl. .............................. 361/679.6; 361/679.02; 361/724; 361/726

(58) Field of Classification Search ......... 361/679–683, 361/724–727; 312/223.1, 223.2; D14/441, D14/446
See application file for complete search history.

(56) References Cited

U.S. PATENT DOCUMENTS

| | | | | |
|---|---|---|---|---|
| 5,547,272 A | * | 8/1996 | Paterson et al. | 312/223.2 |
| 5,825,626 A | * | 10/1998 | Hulick et al. | 361/724 |
| 5,857,364 A | * | 1/1999 | Hsu et al. | 70/120 |
| 6,288,333 B1 | * | 9/2001 | Liu et al. | 174/563 |
| 6,738,255 B2 | | 5/2004 | Chen | |
| 6,795,307 B2 | * | 9/2004 | Arbogast et al. | 361/683 |
| 7,009,845 B2 | | 3/2006 | Chen et al. | |
| 7,151,666 B2 | * | 12/2006 | Song | 361/692 |
| 7,377,602 B2 | * | 5/2008 | Chen et al. | 312/223.2 |
| 7,428,835 B2 | * | 9/2008 | Fan et al. | 70/358 |
| 2005/0046316 A1 | * | 3/2005 | Chen et al. | 312/223.2 |
| 2005/0231901 A1 | * | 10/2005 | Xu | 361/683 |
| 2007/0013276 A1 | * | 1/2007 | Chen et al. | 312/223.2 |
| 2007/0151313 A1 | * | 7/2007 | Fan et al. | 70/101 |
| 2007/0187218 A1 | * | 8/2007 | Chen et al. | 200/296 |

* cited by examiner

*Primary Examiner*—Jayprakash N Gandhi
*Assistant Examiner*—Anthony Q Edwards
(74) *Attorney, Agent, or Firm*—Wei Te Chung

(57) ABSTRACT

A computer enclosure includes a chassis (10), a bezel (20), and a detaching member (30). The chassis has a plate (12) defining at least one locking aperture (123, 124) therein. The bezel is attachable to an outer surface of the plate. At least one hook (25, 26) protrudes from the bezel for engaging into the at least one locking aperture and extending into the chassis. The detaching member is rotatably attached to an inner surface of the plate for outwardly pushing the bezel. At least one pushing portion (32, 33) is formed on the detaching member for abutting against the at least one hook. Before the detaching member is rotated to outwardly push and separate the bezel away from the plate, the at least one pushing portion presses the at least one hook to release from the at least one locking aperture.

19 Claims, 5 Drawing Sheets

COMPUTER ENCLOSURE WITH REMOVABLE BEZEL

FIELD OF THE INVENTION

The present invention relates to computer enclosures, and more particularly to a computer enclosure having a removable bezel.

DESCRIPTION OF RELATED ART

In a conventional computer enclosure, a decorative bezel is usually secured to the computer enclosure.

A mounting means is provided in a computer enclosure which includes a bezel and a plate. A pair of symmetrically opposing pivots is formed on the bezel. A pair of L-shaped bearings is forwardly formed from a bottom portion of the plate. When the bezel is attached to the plate, the pivots of the bezel are pivotally received in the bearings of the plate. The bezel is rotated toward the plate about the pivots. Clasps of the bezel are inserted into slots defined in the plate, and hooks of the plate snappingly engage in engaging apertures defined in the clasps. Thus the bezel fully abuts the plate, and is securely attached thereon. However, it is inconvenient to remove the bezel from the computer enclosure when it is mounted in this way.

Another mounting means is provided in a bezel mounting assembly which includes a bezel, a plate, a lock member, and an operating member attached to the plate. The plate has a plurality of slits, two locking apertures, and a through hole. The bezel forms a plurality of hooks engagingly received in the slits of the plate. The lock member includes a central beam, two side plates, and a resilient portion attached to the bezel and biasing the central beam. Each side plate includes a catch engagingly received in each locking aperture of the plate. The operating member includes a drive body and a press body. When the drive body is pressed downwardly, the press body is rotated to press the central beam downwardly. The catches and the hooks are thereby released from engagement. Then the bezel is fully detached from the plate. In this mounting means, it is convenient to remove the bezel, but the structure thereof is very complicated.

What is needed, therefore, is a computer enclosure having a conveniently removable bezel with a simple structure.

SUMMARY OF THE INVENTION

A computer enclosure includes a chassis, a bezel, and a detaching member. The chassis has a plate defining at least one locking aperture therein. The bezel is attachable to an outer surface of the plate. At least one hook protrudes from the bezel for engaging into the at least one locking aperture and extending into the chassis. The detaching member is rotatably attached to an inner surface of the plate for outwardly pushing the bezel. At least one pushing portion is formed on the detaching member for abutting against the at least one hook. Before the detaching member is rotated to outwardly push and separate the bezel away from the plate, the at least one pushing portion presses the at least one hook to release from the at least one locking aperture.

Other advantages and novel features will be drawn from the following detailed description of preferred embodiments with attached drawings, in which:

DETAILED DESCRIPTION OF THE INVENTION

Figure 1:
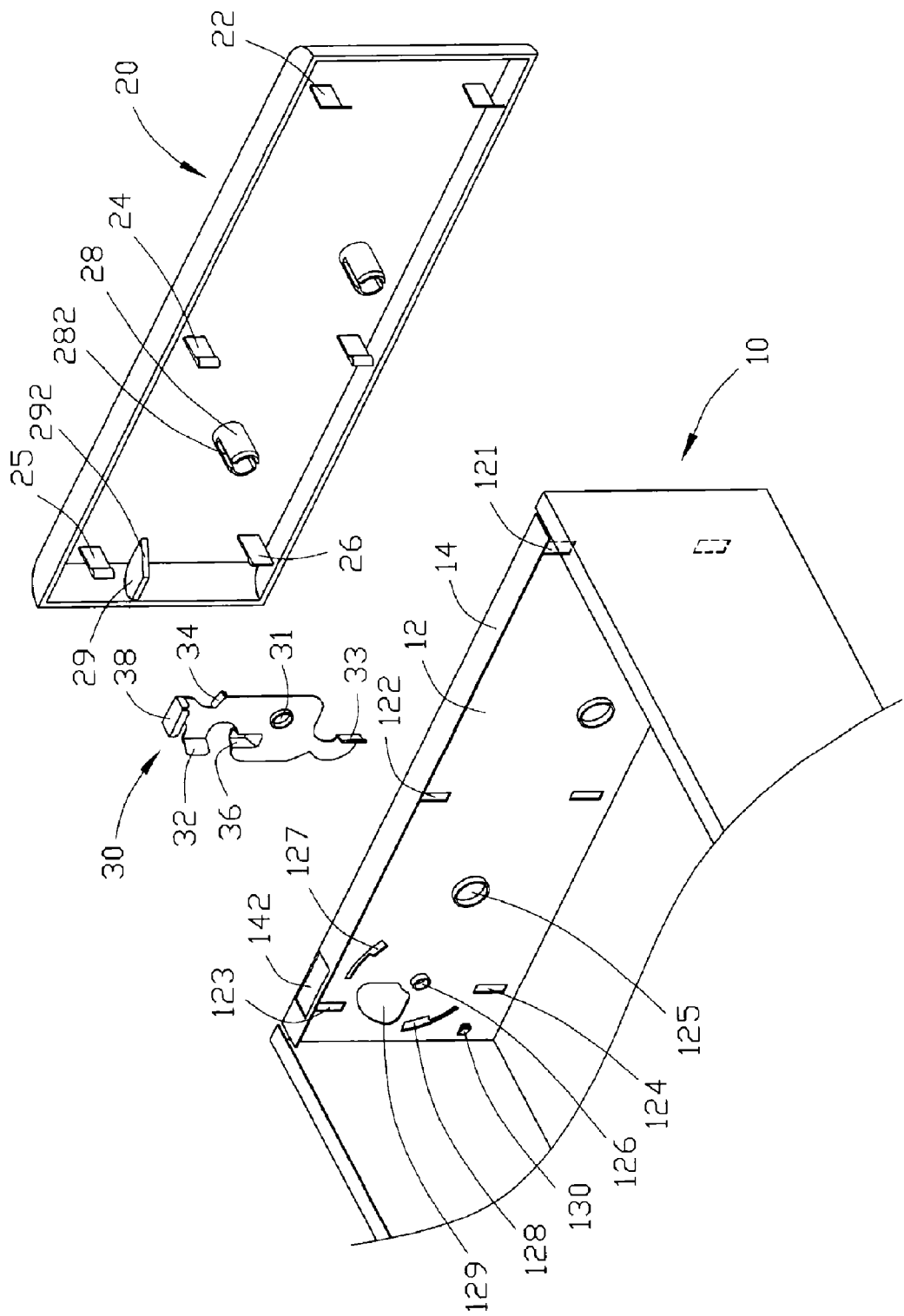
FIG. 1 is an exploded, isometric view of a computer enclosure of a preferred embodiment of the present invention, the computer enclosure including a chassis, a bezel, and a detaching member.

Referring to FIG. 1, a computer enclosure of a preferred embodiment of the present invention includes a chassis 10, a bezel 20, and a detaching member 30.

The chassis 10 has a plate 12 defining two rectangle connecting apertures 121 and a plurality of locking apertures 122, 123, 124 along a longitudinal direction respectively in right, middle and left portions thereof. Two circled securing holes 125 are defined in the plate 12. A hollow pivot post 126 protrudes in from the left portion of the plate 12. A pair of arc-shaped slots 127, 128 is defined in both sides of the pivot post 126. Each of the slots 127, 128 includes a wide portion (not labeled) and a narrow portion (not labeled). A through opening 129 is defined among the locking aperture 123, the slots 127, 128, and the pivot post 126. A slanted tab 130 protrudes in from the plate 12 at a left side of the locking aperture 124 and below the slot 128. The tab 130 has a free end adjacent the locking aperture 124. A flange 14 is perpendicularly bent from a top edge of the plate 12. A rectangle through hole 142 is defined in a left portion of the flange 14.

The bezel 20 is attachable to the plate 12 of the chassis 10. Two connecting pieces 22 and a plurality of hooks 24, 25, 26 protrude in from the bezel 20 along the longitudinal direction, respectively corresponding to the locking apertures 121, 122, 123, 124 of the plate 12. The connecting pieces 22 have free ends bent right therefrom. The hooks 24, 25 have hook portions formed at right sides of free ends thereof. The hook 26 has a hook portion formed at a left side of a free end thereof. Two positioning posts 28 protrude in from a middle of the bezel 20, configured for inserting into the securing holes 125 of the plate 12 to position the bezel 20 with respect to the plate 12. Each positioning post 28 defines a cutout 282 therein for easily deforming. A rib 29 with a slanted surface 292 is formed at a left end of the bezel 20.

Figure 2:
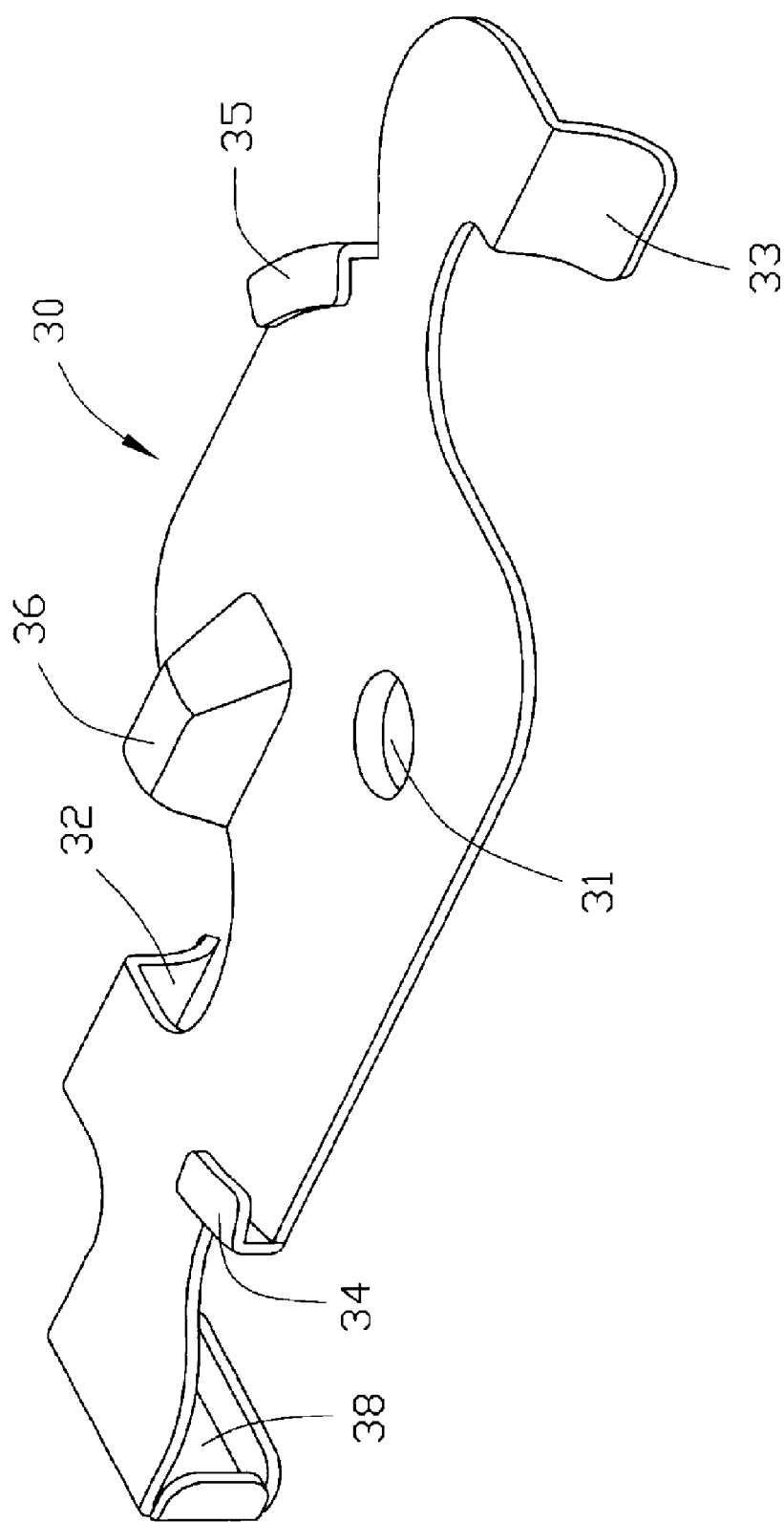
FIG. 2 is another isometric view of the detaching member of FIG. 1.

Referring to FIGS. 1 and 2, the detaching member 30 is rotatably attached to an inner surface of the plate 12. A pivot hole 31 is defined in the detaching member 30, for receiving the pivot post 126 of the plate 12. A pair of pushing portions 32, 33 is bent in from two sides of the pivot holes 31, corresponding to the hooks 25, 26 of the bezel 20. Each of the pushing portions 32, 33 has a surface fitted with a surface of the hook portion of the corresponding one of the hooks 25, 26. A pair of L-shaped sliding portions 34, 35 protrudes out from the two sides of the pivot holes 31, corresponding to the slots 127, 128 of the plate 12. An operating portion 38 is perpendicularly bent in from the detaching member 30 between the pushing portion 32 and the sliding portion 34, for engaging in the through hole 142 of the flange 14 of the plate 12. A protrusion 36, which has an arc-shaped outer surface, is formed out from the detaching member 30, corresponding to the slanted surface 292 of the rib 29 of the bezel 20.

Figure 3:
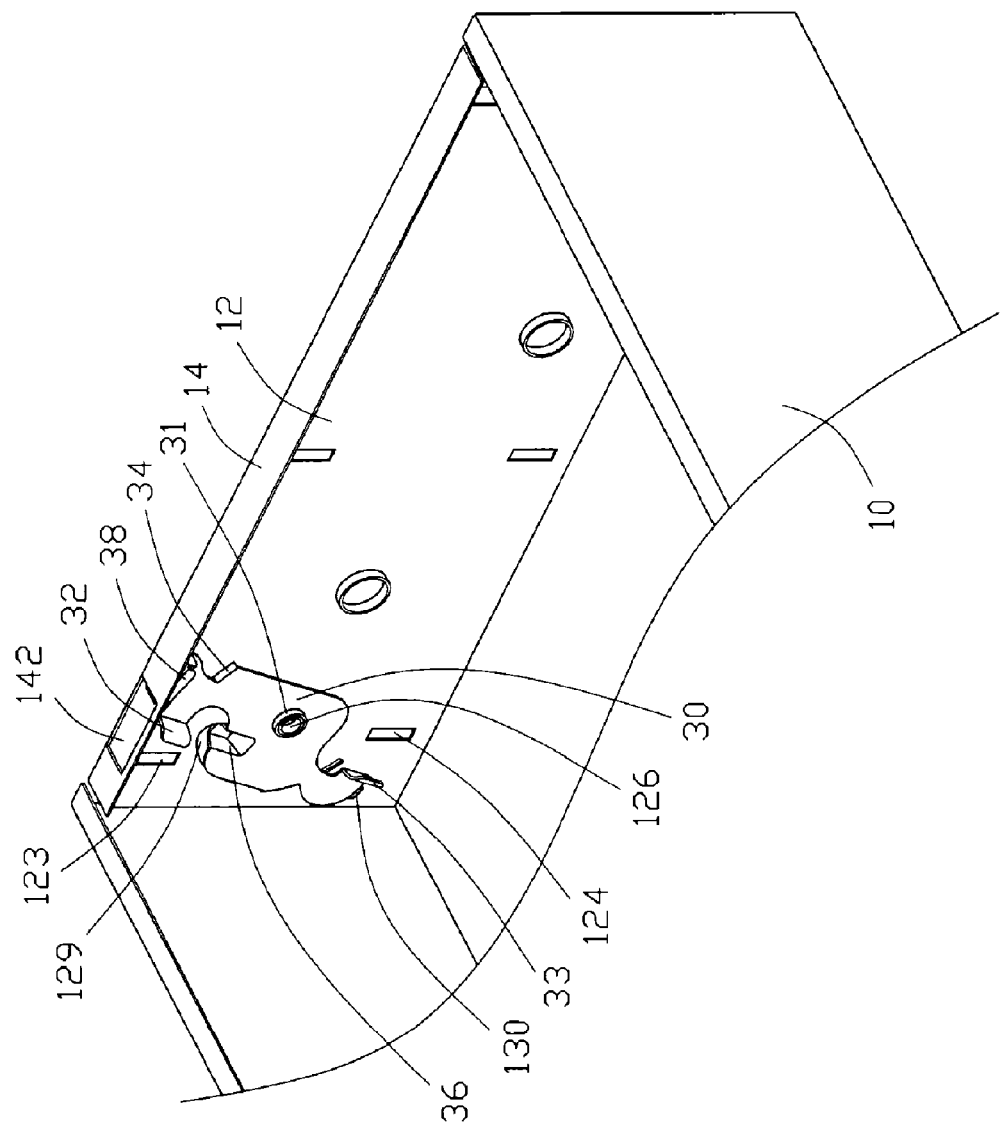
FIG. 3 is an assembled view of the chassis and the detaching member of FIG. 1.
Figure 4:
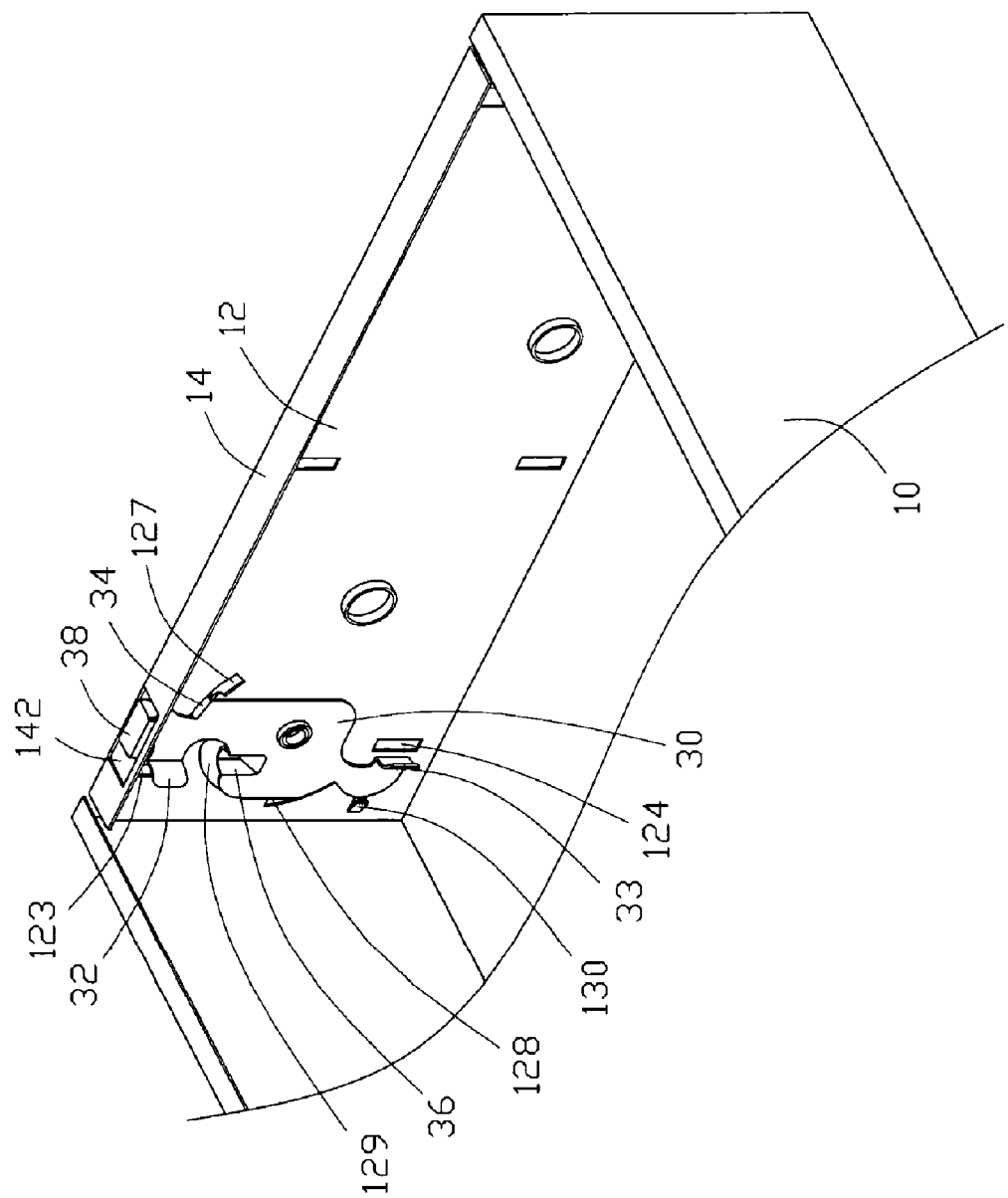
FIG. 4 is another assembled view of the chassis and the detaching member of FIG. 1.

Referring also to FIG. 3, before assembly of the bezel 20, the detaching member 30 is placed in the chassis 10. The pivot hole 31 aligns with the pivot post 126 of the plate 12. The sliding portions 34, 35 align with the wide portions of the slots 127, 128. The protrusion 36 aligns with the through opening 129. The detaching member 30 is pushed to attach to the inner surface of the plate 12. The pivot post 126 is rotatably received in the pivot hole 31. The sliding portions 34, 35 insert into the wide portions of the slots 127, 128. The protrusion 36 inserts through the through opening 129 of the plate 12, and extends out of the chassis 10. The tab 130 is pressed by the detaching member 30, and thereby resiliently deforms. Referring also to FIG. 4, the detaching member 30 is then rotated counter-clockwise. The operating portion 38 is inserted into the through hole 142 of the flange 14 of the plate 12. The sliding portions 34, 35 slide in the slots 127, 128 from the wide portions to the narrow portions to pivotably engage with the plate 12 at the narrow portions, thereby preventing the sliding portions 34, 35 releasing from the plate 12, along a direction perpendicular to a plane of the plate 12. The tab 130 is released from the detaching member 30, and rebounds to block the sliding portions 34, 35 sliding reversely from the narrow portions to the wide portions of the slots 127, 128. Thus, the detaching member 30 is rotatably secured to the inner surface of the plate 12 of the chassis 10.

Figure 5:
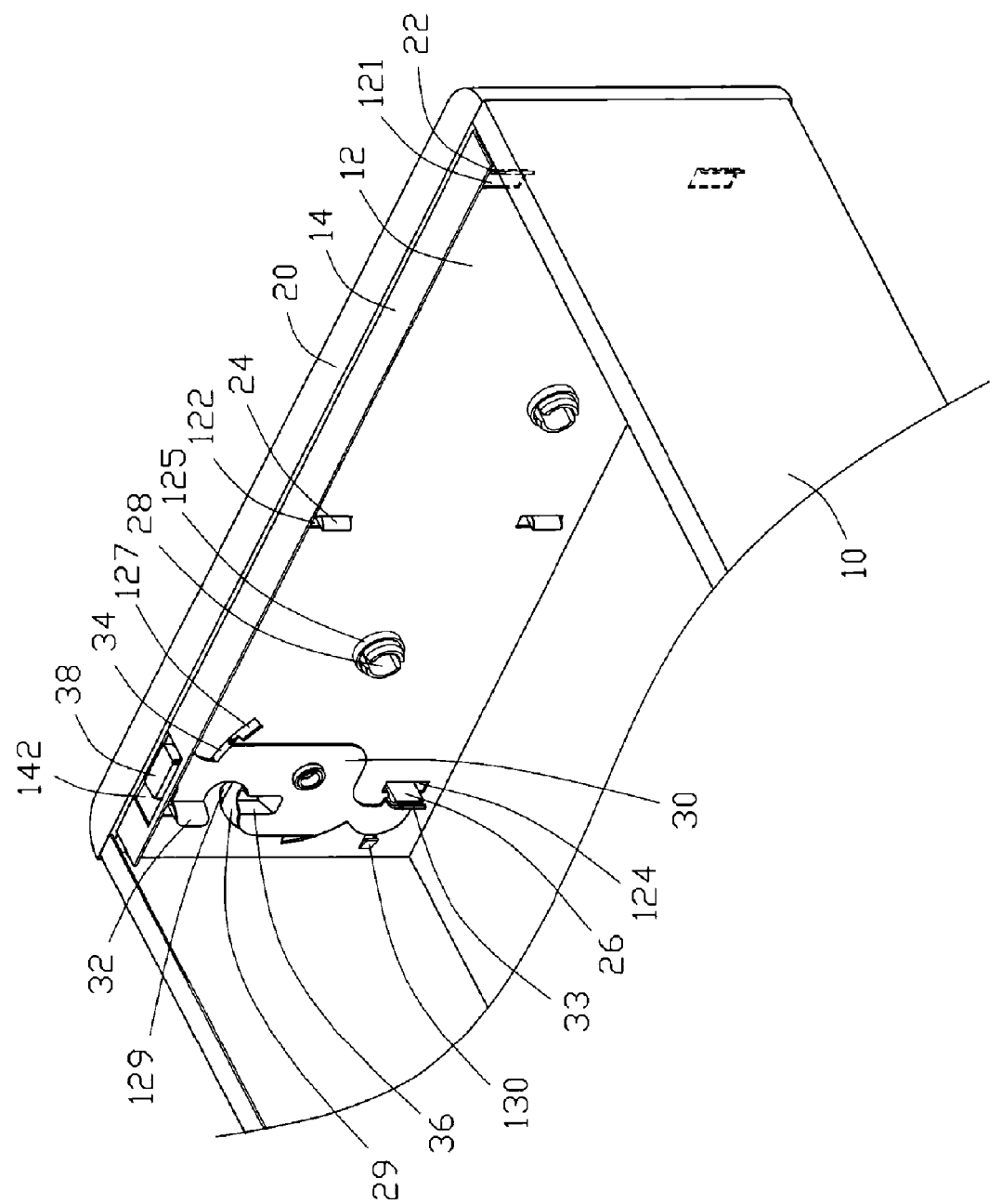
FIG. 5 is an assembled view of FIG. 1.

Referring also to FIG. 5, in assembly of the bezel 20, the connecting pieces 22 of the right portion of the bezel 20 are inserted into the corresponding locking apertures 121 of the plate 12. The bezel 20 is then pivoted toward the plate 12 by pushing the left portion thereof, until the hooks 24, 25, 26 and the positioning posts 28 respectively engage into the locking apertures 122, 123, 124, and the securing holes 125 of the plate 12. The hooks 25, 26 extend through the locking apertures 123, 124, and abut against the pushing portions 32, 33 of the detaching member 30. The protrusion 36 of the detaching member 30 abuts against the slanted surface 292 of the rib 29 of the bezel 20. Thus, the bezel 20 is secured to the outer surface of the plate 12 of the chassis 10.

In removal of the bezel 20, the operating portion 38 is pushed via the through hole 142 of the flange 14 to counter-clockwise rotate the detaching member 30. The pushing portions 32, 33 of the detaching member 30 press the hooks 25, 26 in directions parallel to the plane of the plate 12 to release from the locking apertures 123, 124. At the same time, the protrusion 36 of the detaching member 30 pushes the slanted surface 292 of the rib 29 of the bezel 20 outward. The bezel 20 is thereby pivoted out away from the plate 12. The hooks 25, 26 are pulled out of the locking apertures 123, 124. The hooks 24 and the positioning posts 28 are pulled out of the locking apertures 122 and the securing holes 125, respectively. The connecting pieces 22 can be thereby removed from the locking apertures 121. Thus, the bezel 20 is removed from the plate 12 of the chassis 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
a chassis having a plate defining at least one locking aperture therein;
a bezel attachable to an outer surface of the plate, at least one hook protruding therefrom for engaging into the at least one locking aperture and extending into the chassis; and
a detaching member rotatably attached to an inner surface of the plate for outwardly pushing the bezel, at least one pushing portion formed thereon for abutting against the at least one hook;
wherein before the detaching member is rotated to outwardly push and separate the bezel away from the plate, the at least one pushing portion presses the at least one hook to release from the at least one locking aperture; and the plate of the chassis defines at least one arc-shaped slot, the detaching member forms at least one sliding portion thereon for slidably engaging in the at least one arc-shaped slot.

2. The computer enclosure as described in claim 1, wherein the plate defines a through opening therein, a rib with a slanted surface protruding from the bezel, a protrusion being formed on the detaching member and extending through the through opening to abut against the slanted surface of the rib.

3. The computer enclosure as described in claim 2, wherein the protrusion of the detaching member has an arc-shaped outer surface.

4. The computer enclosure as described in claim 1, wherein the at least one arc-shaped slot comprises a wide portion for the at least one sliding portion inserting therethrough, and a narrow portion for preventing the at least one sliding portion disengaging from the plate.

5. The computer enclosure as described in claim 4, wherein a tab is formed on the plate for blocking the at least one sliding portion of the detaching member sliding from the narrow portion to the wide portion of the at least one arc-shaped slot.

6. The computer enclosure as described in claim 1, wherein an operating portion is formed on the detaching member for driving the detaching member to rotate, a flange being perpendicularly formed at an edge of the plate and defining a through hole for receiving the operating portion of the detaching member.

7. The computer enclosure as described in claim 1, wherein the at least one hook is two hooks, and the at least one locking aperture is two locking apertures, and the at least one pushing portion is two pushing portions which abut against the hooks, the detaching member being rotated to have the two pushing portions press the two hooks to release from the two locking apertures.

8. A computer enclosure comprising:
a chassis having a plate defining a through opening therein;
a bezel releasably secured to an outer surface of the plate, the bezel forming a rib with a slanted surface; and
a detaching member rotatably attached to an inner surface of the plate, a protrusion being formed on the detaching member and extending through the through opening to abut against the slanted surface of the rib;
wherein when the detaching member is rotated, the protrusion of the detaching member pushes the slanted surface of the rib to separate the bezel away from the plate of the chassis.

9. The computer enclosure as described in claim 8, wherein the plate defines a locking aperture therein, a hook being formed on the bezel releasably engaging into the locking aperture of the plate.

10. The computer enclosure as described in claim 9, wherein a pushing portion is formed on the detaching member, and when the detaching member is rotated the pushing portion presses the hook of the bezel thereby disengaging the hook from the locking aperture of the plate.

11. The computer enclosure as described in claim 8, wherein at least one arc-shaped sliding slot is defined in the plate, at least one sliding portion being formed on the detaching member mating with the at least on sliding slot to slidably restrict the detaching member on the plate.

12. The computer enclosure as described in claim 11, wherein the at least one slot comprises a wide portion for the at least one sliding portion inserting therethrough, and a narrow portion for preventing the at least one sliding portion disengaging from the plate.

13. The computer enclosure as described in claim 12, wherein a tab is formed on the plate for blocking the at least one sliding portion of the detaching member sliding from the narrow portion to the wide portion of the at least one slot.

14. The computer enclosure as described in claim 8, wherein an operating portion is formed on the detaching member for driving the detaching member, a flange being perpendicularly bent from an edge of the plate, the flange defining a through hole for receiving the operating portion.

15. A computer enclosure comprising:
- a chassis having a plate defining a plurality of locking apertures therein;
- a bezel releasably secured to an outer surface of the plate, the bezel forming a plurality of hooks engaging with the locking apertures; and
- a detaching member rotatably attached to the plate, a pushing structure being formed on the detaching member;
- wherein when the detaching member is rotated, the pushing structure of the detaching member pushes the bezel outward to urge the hooks to disengage from the locking apertures, thereby separating the bezel away from the plate of the chassis; an operating portion is formed on the detaching member for driving the detaching member to rotate; and a flange is perpendicularly formed at an edge of the plate and defining a through hole for receiving the operating portion of the detaching member.

16. The computer enclosure as described in claim 15, wherein a slanted surface is formed at one of the bezel and the pushing structure, and when the detaching member is rotated the pushing structure slides relative to the bezel along the slanted surface.

17. The computer enclosure as described in claim 15, wherein at least one positioning post is formed from the bezel, and at least one hole is defined in the plate for receiving the at least one positioning post.

18. The computer enclosure as described in claim 15, wherein at least one connecting aperture is defined in the plate, and at least one connecting piece is formed from the bezel and is insertable into the at least one connecting aperture to pivotably connect the bezel to the plate when the hooks are disengaged from the locking apertures.

19. The computer enclosure as described in claim 15, wherein the detaching member further comprises a pushing portion configured for pushing one of the hooks in a direction parallel to the plate to disengage said one of the hooks from a corresponding one of the locking apertures.

* * * * *

UNITED STATES PATENT AND TRADEMARK OFFICE
CERTIFICATE OF CORRECTION

PATENT NO. : 7,609,516 B2
APPLICATION NO. : 11/309400
DATED : October 27, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 571 days.

Signed and Sealed this

Twelfth Day of October, 2010

David J. Kappos
*Director of the United States Patent and Trademark Office*